Sept. 12, 1933.   J. R. WHITTLES   1,927,007
GRINDING MACHINE
Filed March 26, 1931   8 Sheets-Sheet 5

Inventor
Joseph R. Whittles
By Chindahl, Parker & Carlson
Attys.

Sept. 12, 1933.  J. R. WHITTLES  1,927,007
GRINDING MACHINE
Filed March 26, 1931   8 Sheets-Sheet 7

Inventor
Joseph R. Whittles
By Chindahl, Parker & Carlson
Attys

Sept. 12, 1933.  J. R. WHITTLES  1,927,007
GRINDING MACHINE
Filed March 26, 1931   8 Sheets-Sheet 8

Inventor
Joseph R. Whittles
By Chindahl, Parker & Carlson
Attys.

Patented Sept. 12, 1933

1,927,007

UNITED STATES PATENT OFFICE 1,927,007

GRINDING MACHINE

Joseph R. Whittles, Rockford, Ill., assignor to Mattison Machine Works, Rockford, Ill., a corporation of Illinois Application March 26, 1931. Serial No. 525,391

16 Claims. (Cl. 51—92)

The present invention relates generally to improvements in grinding machines, and has particular reference to a new and improved machine for grinding plane surfaces.

Various objects of the invention reside in the provision of a novel grinding machine which is rigid and sturdy in construction, which is highly accurate in use, and which is capable of performing precision work at a high rate of speed.

Plane surface grinding machines ordinarily comprise a horizontal reciprocatory work table, a vertically adjustable headstock slide, and a wheel slide mounted on the headstock slide for horizontal adjustment transversely of the work table.

One of the important objects of the present invention resides in the provision of two spaced vertical columns for guiding opposite sides of the headstock slide, thereby eliminating objectionable overhang, providing a balanced, steady mounting, and permitting ease and accuracy of adjustment without play or chattering.

Another object is to provide means for feeding the headstock slide vertically, including a novel automatic limit stop and a new and improved indicator stop available either for manual or power drive.

A further object resides in the provision with a clutch for selectively connecting an electric drive or a manual drive to the headstock slide, of a novel clutch actuator including a switch actuator for the electric drive, both actuators being adapted to be gripped and operated simultaneously by one hand.

Still another object is to provide novel means for traversing or indexing the wheel slide, including an adjustable and automatic reversing mechanism.

A further object resides in mounting the hand controls and indicators for the headstock and wheel slides at the front of the machine where they are always in view and are readily accessible.

Other objects and advantages will become apparent as the description proceeds.

In the accompanying drawings.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 1:
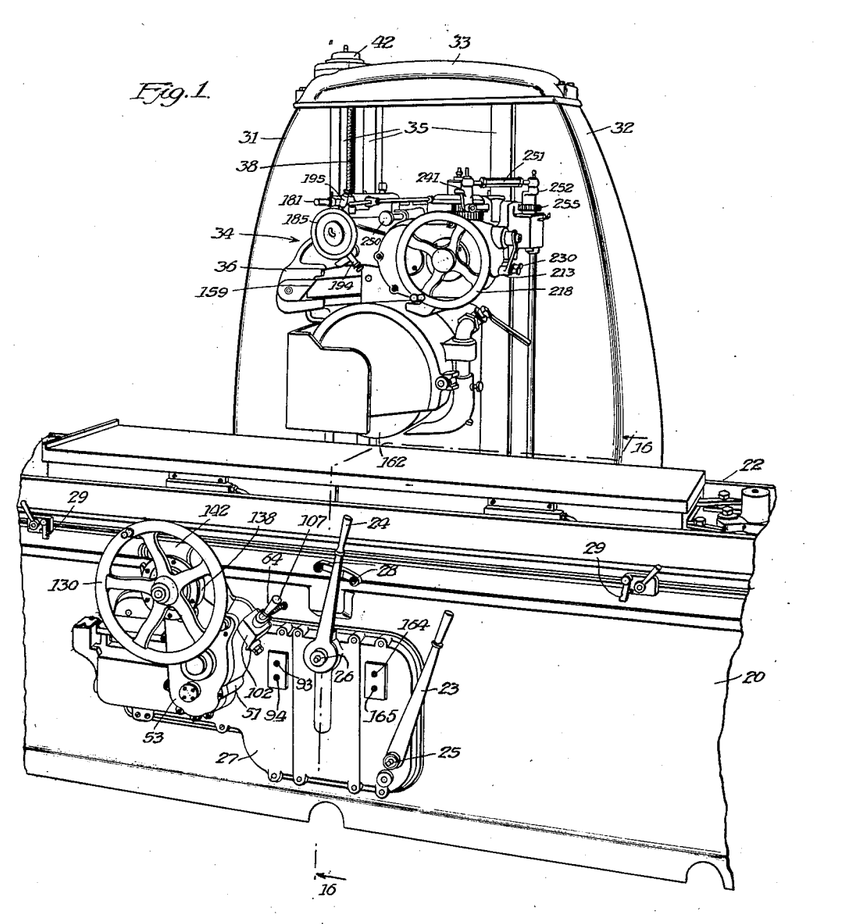
Figure 1 is a front view in perspective of a machine embodying the features of my invention.

Referring more particularly to the drawings, the grinding machine constituting the exemplary embodiment of the invention comprises an elongated horizontal bed 20 (see Fig. 1) adapted to be mounted on the floor and formed on the top with parallel longitudinal ways 21. Mounted for reciprocation on the ways 21 is an elongated work table 22 adapted to support the work to be ground, and preferably formed with upstanding sides and ends to form a trough for catching coolant supplied during the grinding operation. While the machine is adapted for grinding a variety of work, it is particularly adapted for grinding flat surfaces, as for example the sides of flat hand wrenches, the flat faces of metal bars, etc.

Any suitable drive may be provided for the work table 22. Preferably, hydraulic means variable in speed and reversible to drive the table 22 selectively in either direction is employed. The details of the hydraulic means per se form no part of the present invention, and hence are not disclosed herein. It is sufficient to say that the hydraulic drive is adapted to be rendered operative or inoperative by actuating a hand lever 23, and is reversible through actuation of a hand lever 24. Both levers 23 and 24 are secured respectively on the front of rock shafts 25 and 26 journaled at their front ends in a cover bracket 27 mounted on the front wall of the bed 20, and operatively connected respectively to a start and stop valve and a reversing valve (not shown). To provide means for automatically oscillating the lever 24, it is provided with two rearwardly extending abutments 28 positioned for engagement respectively by two spaced reversing dogs 29 adjustably mounted on the front of the work table 22.

Figure 2:
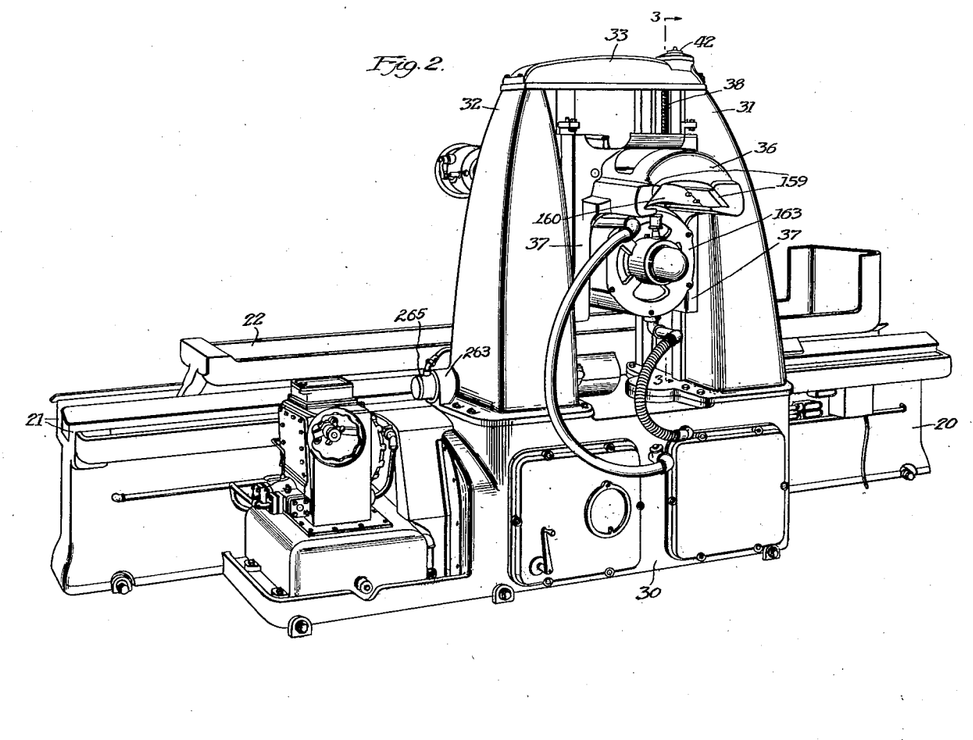
Fig. 2 is a rear perspective view.

The rear of the bed 20 is formed substantially midway of its ends with a rearward extension 30 (see Fig. 2). Rigidly mounted on the extension 30 are two spaced vertical columns 31 and 32 which are connected at their upper ends by a cross member 33, and on which a grinding spindle headstock 34 is guided for vertical movement. To this end, the inner vertical walls of the columns 31 and 32 are formed with opposed vertical dovetailed guides 35, and the headstock 34 comprises a vertical carriage or slide 36 extending from over the table 22 between the columns, and formed on opposite sides with elongated depending guideways 37 slidably engaging the guides 35.

To support the headstock 34 for vertical drive or hand adjustment, a vertical feed screw 38 (see Fig. 3) extending along the column 31 between the associated guides 35 is in threaded engagement with a nut 39 rigidly mounted in a sleeve 40 secured by means of a bolt 41 (see Fig. 4) to the adjacent side wall of the slide 36. Of the feed screw 38, the upper end is rotatably anchored in an anti-friction bearing 42 mounted in the cross member 33, and the lower end is likewise anchored in an anti-friction bearing 43 mounted in the bottom wall of a gear housing 44 secured to the underside of the column 31.

The double column construction provides a sturdy, balanced mounting for the headstock 34 which prevents vibration and permits ready and accurate adjustment. Both sides of the slide 36 are guided, thus eliminating objectionable unbalanced overhang and any tendency to bind on the supporting feed screw 38. As a result, the grinding operation can be carried out with extreme accuracy, precision and speed.

The feed screw 38 is adapted for connection to suitable drive means subject to adjustment and control from the front of the machine within convenient range of the operator. In the present instance, the drive connection comprises a bevel gear 45 secured to the lower end of the feed screw 38 and meshing with a bevel gear 46 with an elongated hub 47 journaled in suitable anti-friction bearings 48 in the front wall of the housing 44. A transverse shaft 49 secured to the gear 46 extends forwardly through the bed 20, and is journaled intermediate its ends in a bearing 50 formed in the rear wall of a housing or apron 51 removably mounted in the front wall of the bed 20. The front end of the shaft 49 is journaled in an anti-friction bearing 52 mounted in a front cover plate 53 for the housing 51.

Rotatably mounted in spaced relation on the shaft 49 within the housing 51 are two gears 54 and 55 (see Fig. 5) connected respectively to a power drive and a manual drive, and formed on their adjacent faces with opposed clutch elements 56 and 57. Splined to the shaft 49 between the gears 54 and 55 for axial movement selectively into operative engagement with either of the clutch elements 56 and 57 is a clutch sleeve 58 having a peripheral groove 59. A shifter arm 60 (see Fig. 7) extends at one end into operative engagement with the groove 59, and at the other end outwardly through an opening 61 in one side wall of the housing 51. The outer end of the arm 60 is secured to one end of a rock shaft 62 journaled in an upwardly inclined lug 63 on the outside of the aforesaid housing wall. Secured to the other end of the shaft 62 is a hand lever 64.

The gear 54 meshes with a pinion 65 (see Fig. 6) secured on an intermediate shaft 66 journaled in the housing 51. A gear 67 secured on the shaft 66 meshes with a pinion 68 fixed on a shaft 69 driven through reducing gears 70 and 71 by an electric motor 72 mounted on the inner wall of the housing 51 within the bed 20. It will thus be evident that when the lever 64 is actuated to engage the sleeve 58 with the clutch element 56, the drive connection from the motor 72 to the feed screw 38 is established.

Figures 18, 19, 20:
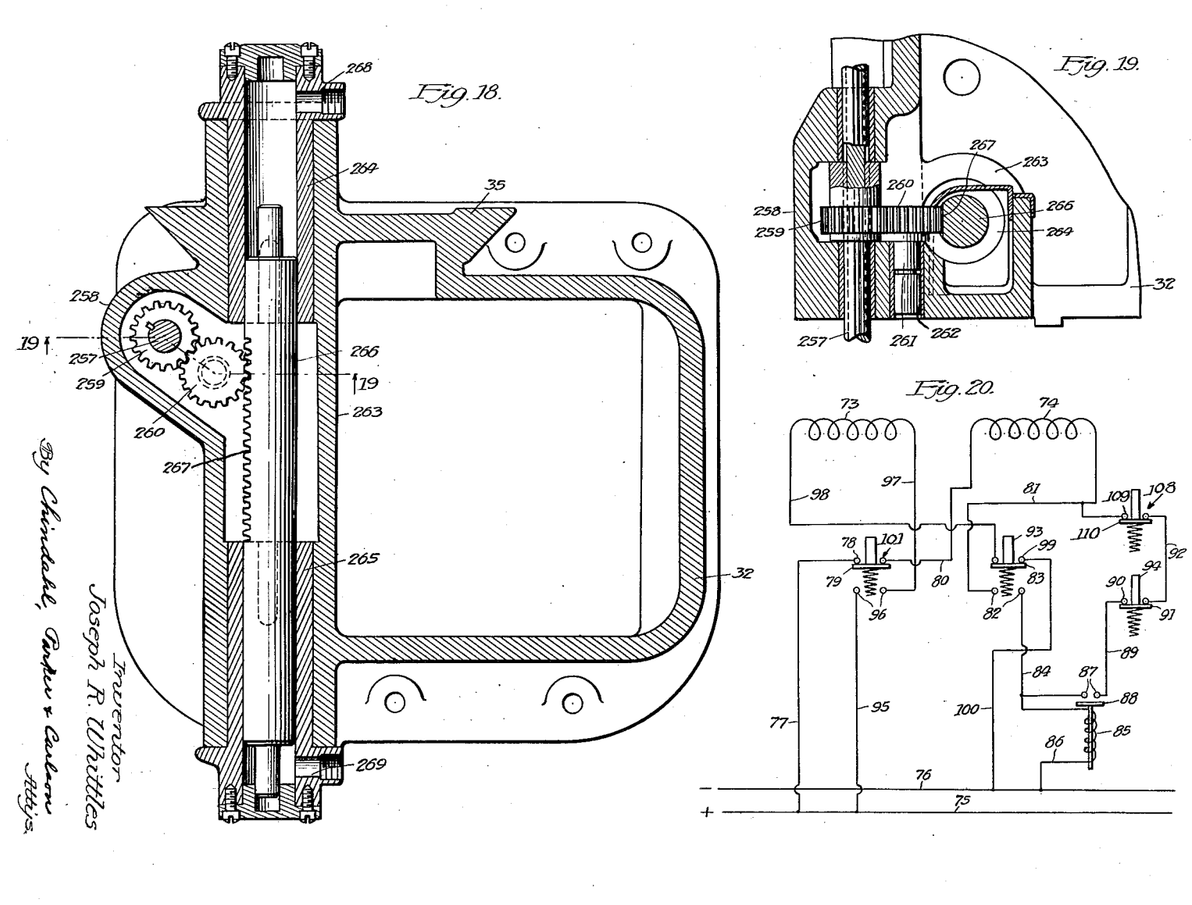
Fig. 18 is a horizontal sectional view taken along line 18—18 of Fig. 17.
Fig. 19 is a fragmentary sectional view taken along line 19—19 of Fig. 18.
Fig. 20 is a diagrammatic representation of the electric circuits for the vertical feed motor.

The motor 72 is of the reversible type, and for purposes of illustration is shown diagrammatically in Fig. 20 as comprising a winding 73 which when energized will effect upward movement of the headstock 34, and a winding 74 which when energized will effect downward movement of the headstock. The winding 74 is adapted to be connected across main line terminals 75 and 76, the circuit leading from the terminal 75, through a wire 77, spaced switch contacts 78 normally closed by a spring-pressed contact 79, a line 80, the winding 74, a line 81, spaced switch contacts 82 normally open and adapted to be closed by a spring-pressed contact 83, a line 84, a solenoid 85 and a line 86 to the terminal 76. Thus, actuation of the contact 83 to bridge the contacts 82 will cause energization of the winding 74.

A holding circuit is provided for preventing deenergization of the winding 74 upon releasing the contact 83, and in the present instance this circuit leads from the line 84 through spaced switch contacts 87 normally open but adapted to be closed by a contact 88 upon energization of the solenoid 85, a line 89, spaced switch contacts 90 normally closed by a spring-pressed contact 91, and a line 92 to the line 81. The contacts 83 and 91 are provided respectively with push button actuators 93 and 94 mounted in the front cover bracket 27 of the bed 20, and are adapted respectively upon actuation to institute the downward movement of the headstock 34 and to stop this movement at will.

The winding 73 is adapted for connection across the terminals 75 and 76, the circuit leading from the terminal 75 through a line 95, spaced switch contacts 96 normally open but adapted to be closed by the contact 79, a line 97, the winding 73, a line 98, spaced switch contacts 99 normally closed by the contact 83 and a line 100 to the terminal 76. It will be evident that downward movement can be instituted by actuating the button 93 only when the contact 79 bridges the contacts 78, i. e. when the winding 73 is deenergized, and that upward movement can be instituted at will by depressing the contact 79 to bridge the contacts 96, thereby opening the contacts 78 to deenergize or prevent energization of the winding 73.

Figures 3, 5, 6, 7:
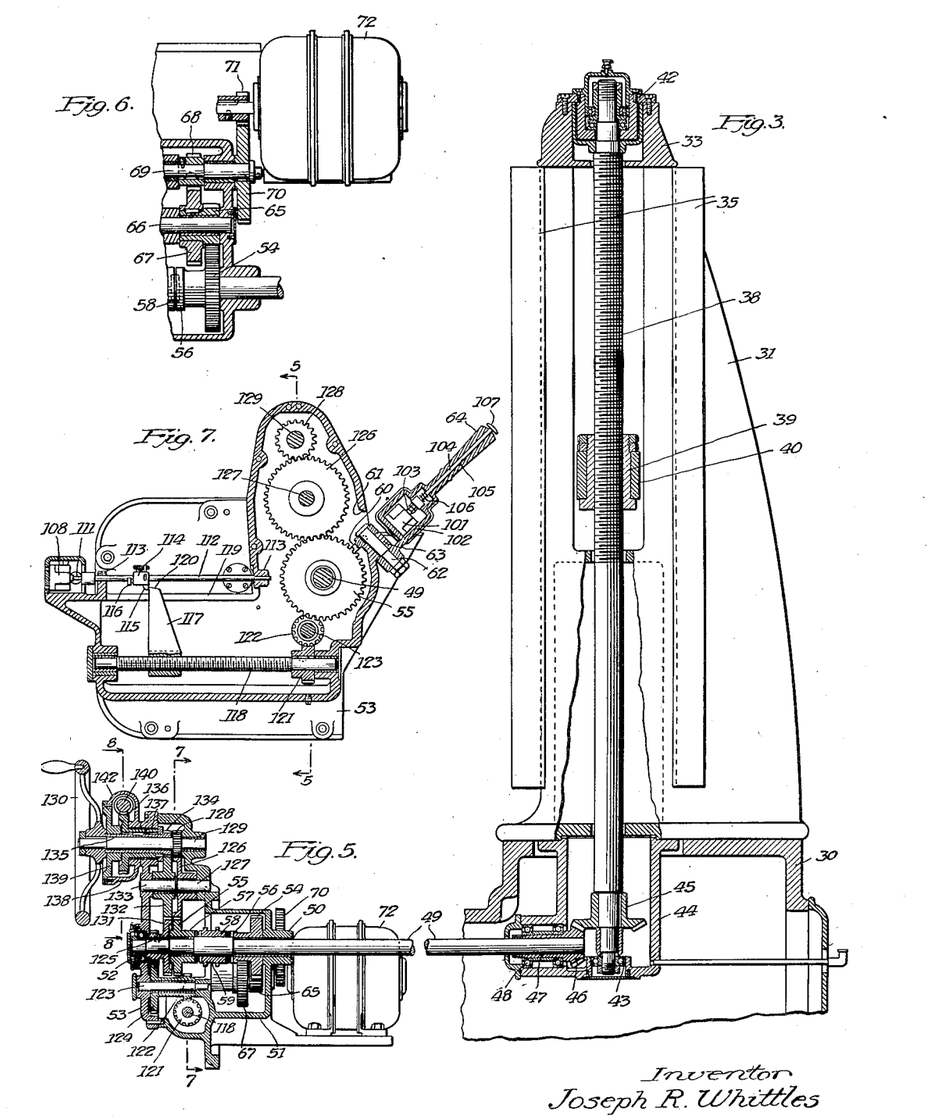
Fig. 3 is a fragmentary vertical sectional view taken substantially along line 3—3 of Fig. 2.
Fig. 5 is a vertical sectional view taken substantially along line 5—5 of Fig. 7.
Fig. 6 is a sectional view of a portion of the power drive for the vertical feed screw.
Fig. 7 is a vertical sectional view taken substantially along line 7—7 of Fig. 5.

The contacts 78 and 96 and the movable contact 79 constitute a unitary switch 101 which is mounted within a chamber 102 formed in the base of the clutch lever 64 (see Fig. 7). The contact 79 is provided with an actuating stem 103 in alignment and abutment with a rod 104 extending slidably through a longitudinal bore 105 in the outer end of the lever 64 into the chamber 102. Spring means 106 acting on the inner end of the rod 104 tends to hold the latter in engagement with the stem 103, and the spring action of the stem tends to hold the rod 104 normally in its outermost position. The outer end of the rod 104 is provided with a push button 107 overlying the end of the lever 64 and adapted for actuation to effect energization of the winding 73. In the present instance, the button 107 must be held continuously depressed during the upward movement of the headstock 34. The arrangement is highly convenient since the operator can with one hand grasp the lever 64 to institute the power drive and at the same time depress the button 107, to cause the headstock 34 to move upwardly.

An adjustable limit stop means is provided for automatically interrupting the downward movement of the headstock 34 at a predetermined point. In the present instance, the stop means comprises a switch 108 interposed in the line 92 and having spaced switch contacts 109 normally closed by a spring-pressed contact 110. Actuation of the contact 110 to open the switch 108 is effective in the same manner as the contact 91 to interrupt the circuit for the winding 74. The contact 110 is provided with an actuating stem 111 in end abutment with a rod 112 slidable in spaced bearings 113 formed on the housing 51. Adjustable lengthwise of the rod 112 is a block 114 in which a pivotal gravity pawl 115 is mounted. A stop screw 116 is adjustably threaded into the block 114 for engagement by one side of the pawl 115.

The pawl 115 when against the screw 116 is disposed in the path of an abutment 117 movable in timed relation to the headstock 34. In the present instance, the abutment 117 is in the form of an upstanding arm threaded on a lead screw 118 parallel to the rod 112 and rotatably anchored in the housing 51. The upper end of the arm 117 is guided in a slot 119 formed in the top wall of the housing 51, and has an inclined end face 120 adapted to lift the pawl 115 and permit movement past same if necessary upon upward movement of the headstock 34.

Keyed to the feed screw 118 is a spiral gear 121 which meshes with a spiral gear 122 rotatable on a stub shaft 123 in the front of the housing 51. The gear 122 is rigid with a gear 124 which meshes with a gear 125 fixed on the shaft 49 to complete the drive connection from the headstock feed screw 38 to the feed screw 118.

The gear 55 on the shaft 49 meshes with an intermediate gear 126 which is journaled in a stud 127 on the rear wall of the housing 51, and which meshes with a gear 128 fixed on a shaft 129 journaled in the upper end of the housing 51. A hand wheel 130 is fixed to the front end of the shaft 129 for adjusting the headstock 34 manually upon engagement of the clutch sleeve 58 with the clutch element 57.

Vertical feed over any desired range within the limits of movement of the headstock 34, whether driven manually or by power, may be measured by indicator means movable synchronously therewith and available at will. In the present instance, the drive for the indicator means comprises a gear 131 integral with the gear 125 and keyed to the shaft 49. The gear 131 meshes with an idler gear 132 journaled on a fixed stud 133 mounted on the inside of the cover plate 53. The idler gear 132 meshes with a pinion 134 rigid with the inner end of an elongated sleeve 135 rotatable on the shaft 129 and extending through the cover plate 53.

The indicator means (see Figs. 5 and 8) in its preferred form comprises a worm gear 136 with a rearwardly extending hub 137 rigidly keyed to the sleeve 135 and journaled in the upper end of the cover plate 53. Rotatably mounted on the hub 137 between the cover plate 53 and the gear 136 is a generally circular housing 138 having a removable front cover plate 139 journaled on the sleeve 135 between the hand wheel 130 and the gear 136. A worm 140 in mesh with the worm gear 136 is rigid with a shaft 141 within a tangential enlargement 142 formed in the peripheral wall of the housing 138. The shaft 141 is journaled in bearings 143 and 144 fixed in opposite ends of the enlargement 142.

Provided on the outer end of the bearing 143 against the adjacent end of the enlargement 142 is a disk 145 with a beveled peripheral dial surface. The outer end of shaft 141 is reduced to define a peripheral shoulder 146 just outside of the disk 145. Rotatably mounted on the reduced end of the shaft 141 against the shoulder 146 and in cooperative relation with the disk 145 is a micrometer dial 147. The latter is formed with a hub 148 extending outwardly in spaced concentric relation to the shaft 141. An adjusting knob 149 is fixed on the outer end of the shaft 141 against the hub 148. A coiled compression spring 150 disposed on the shaft 141 within the hub 148 serves to hold the dial 147 frictionally against the shoulder 146 to prevent self adjustment. It will be evident that the housing 138 is driven in timed relation to the headstock 34 and is subject to relative phase adjustment by rotating the worm 140, such adjustment being indicated by the dial 147.

The other bearing 144 has an abutment 151 extending outwardly from the housing 138 and formed with a notch 152 in the leading side upon movement in a clockwise direction, occurring during downward movement of the headstock 34. A stop pawl 153 (see Fig. 8) pivotal at its lower end on a stud 154 in the cover plate 53 is movable selectively into an operative position in which its upper end is disposed in the path of the abutment 151 for engagement in the notch 152, or into an inoperative position beyond said path. A spring-pressed detent 155 serves to hold the pawl 153 yieldingly in either position.

In operation, when the headstock 34 under power drive nears the predetermined downward feed limit, the arm 117 engages the pawl 115 to open the switch 108 and thereby stop the motor 72 to bring the grinding wheel 162 up to the work. Lever 105 is shifted to connect the hand wheel 130 to the drive shaft 49. Then the hand wheel 130 is revolved to bring the grinding wheel into contact with the surface of the work. Now the knob 149 is adjusted to move the abutment 151 against the pawl 153, and the dial 147 is then rotated into the zero setting. Thereupon, the knob 149 is reversed to move the abutment 151 away from the pawl 153 a distance determined by the amount of feed to be imparted to the headstock 34 in taking the grinding cut to the finished depth. The hand wheel 130 is actuated until the abutment 151 again engages the pawl 153, thus completing the feed.

Formed on the outer periphery of the housing 138 is a cam lug 156 movable in a counterclockwise direction upon upward movement of the headstock 34 into engagement with a rounded projection 157 on the inner side of the pawl 153 to move the latter out of operative position. A coil spring 158 (see Fig. 9) acting on the pawl 153 is effective to return the latter after release by the cam lug 156 to operative position unless the pawl has been moved into its inoperative position.

Formed on the underside of the vertical slide 36 transversely of the bed 20 are opposed dovetailed guideways 159 in which a cross slide 160 is slidably disposed. Journaled in the slide 160 is a spindle (not shown), the front end of which supports a grinding wheel 162, and the rear end of which is connected to an air-cooled motor 163 mounted on the underside of the slide. The motor 163 is controlled by start and stop push buttons 164 and 165 mounted on the front of the cover plate 27.

Figure 13:
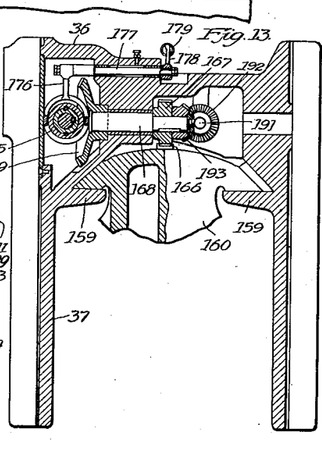
Fig. 13 is a vertical sectional view taken along line 13—13 of Fig. 14.

The cross drive for the slide 160 comprises a gear rack 166 secured thereon meshing with a gear 167 fixed on a transverse shaft 168 (see Fig. 13). The latter is journaled in one side wall of the slide 36 and has a bevel gear 169 fixed on its outer end. The gear 169 meshes with opposed bevel gears 170 and 171 which are rotatable on a shaft 172 (see Fig. 14) journaled in spaced bearings in the slide 36, and which are formed on their adjacent faces respectively with clutch elements 173 and 174. A clutch sleeve 175 is splined to the shaft 172 for movement selectively into engagement with either of the elements 173 and 174, the parts constituting a direction clutch for controlling the direction of feed of the slide 160.

Figure 12:
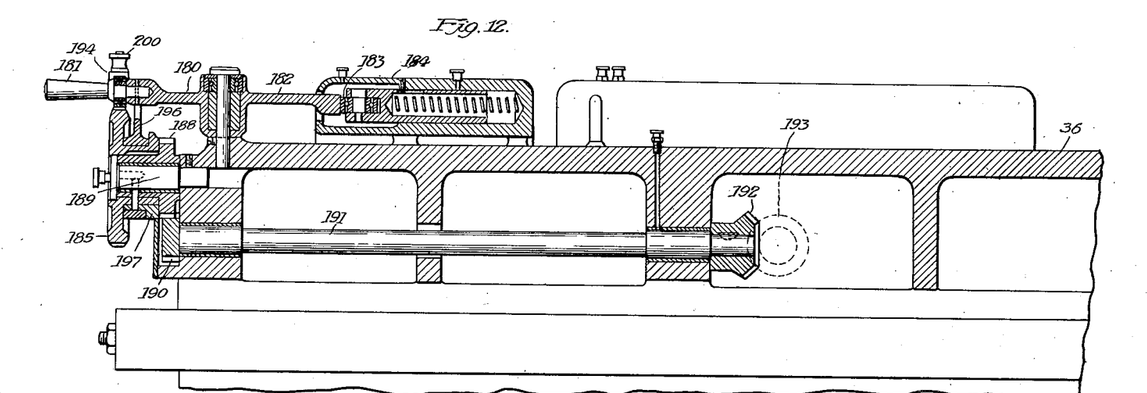
Fig. 12 is a vertical sectional view taken along line 12—12 of Fig. 11.

Embracing the clutch sleeve 175 is a yoke 176 fixed at its upper end to a rock shaft 177 journaled in the top of the slide 36. An upstanding arm 178 (see Fig. 10) secured to the shaft 177 is connected through a draw rod 179 to one arm of a bell-crank lever 180 pivoted on the slide 36. The other arm of the lever 180 constitutes a handle 181 extending forwardly of the slide 36 for manual actuation from the front of the machine. The lever 180 also is formed with a rearwardly extending arm 182 having a pointed end coacting with a spring-pressed roller 183 for holding the lever and hence the clutch sleeve 175 yieldably in one position or the other. A housing 184 (see Fig. 12) on the slide 36 encloses the roller 183 and the coacting end of the arm 182.

The clutch handle 181 is automatically reversible upon movement of the cross slide 160 into either extreme position of an adjustable predetermined range. To this end, a feed indicator preferably in the form of a graduated dial 185 (see Figs. 11 and 12) is mounted on the front end of the slide 36 for movement in timed relation to the feed of the slide 160. Formed respectively in opposite sides of the periphery of the dial 185 and calibrated in accordance with suitable graduations to the movement of the slide 160 are two sets of oppositely inclined ratchet teeth 186 and 187.

The dial 185 has an axial hub fixed on the hub of a gear 188 rotatable on a stud 189 and meshing with a gear 190 on the front end of a shaft 191 journaled within the slide 36. The rear end of the shaft 191 is constantly connected through bevel gears 192 and 193 to the shaft 168.

The dial 185 carries a pair of adjustable spaced throw-over dogs or abutments 194 and 195 disposed at opposite sides of the handle 181. In their preferred form, the dogs 194 and 195 consist of sleeves respectively on the outer end of two arms 196 and 197 and overhanging the periphery of the dial 185. The inner ends of the arms 196 and 197 are pivotally mounted in concentric relation on the hub of the dial 185. Slidably mounted respectively in the dogs 194 and 195 are two tooth detents 198 and 199 spring-pressed respectively into engagement with the ratchet teeth 186 and 187. The outer ends of the detents 198 and 199 are provided with hand knobs 200 whereby they may be lifted out of engagement with the teeth 186 and 187 to permit selective peripheral adjustment. It will be evident that the dogs 194 and 195 constitute means whereby the range of movement of the feed slide 160 as to extent and location relative to the work table 22 may be adjusted, and whereby the movement may be automatically reversed.

The drive shaft 172 is journaled at its forward end (see Fig. 14) in a gear housing 201 mounted on the front end of the slide 36 and having a removable front cover plate 202, and is adapted to be connected through a clutch 203 either to a power drive or a manual drive.

The clutch 203 comprises a sleeve 204 slidably splined to the shaft 172 for selective movement into engagement with either of two spaced opposed clutch elements 205 and 206 freely rotatable on the shaft 172. A yoke 207 embracing the sleeve 204 is secured to one end of a pivot shaft 208 (Figs. 10 and 14) mounted in the slide 36. The other end of the shaft 208 is connected through an arm 208ª and a draw rod 209 to a vertically disposed crank arm 210 fixed on the inner end of a rock shaft 211. The latter is journaled in and extends through a tubular shaft 212 journaled in one side wall of the housing 201. Secured to the outer end of the shaft 211 is a depending hand lever 213 (Fig. 11) carrying a spring-pressed detent 214 for holding it yieldable in one extreme position or the other.

The clutch element 205 is rigid with a gear 215 meshing with a pinion 216 on the inner end of a shaft 217 journaled in and extending to the front of the housing 201. A hand wheel 218 having a bearing sleeve 219 rotatable on the front end of the shaft 217 is adapted to be connected through a clutch 220, either directly for a high speed drive or indirectly through back gears for a slow speed drive, to the shaft 172.

The clutch 220 comprises a sleeve 221 slidably splined to the shaft 217 for selective movement into engagement with either of two spaced clutch elements 222 and 223 freely rotatable on the shaft. The clutch element 222 is rigid with the sleeve 219 and the latter is rigid with a pinion 224 meshing with a gear 225 freely rotatable on the shaft 172. The gear 225 is rigid with a pinion 226 meshing with a gear 227 rigid with the clutch element 223. A shifting yoke 228 embraces the clutch sleeve 221 and is fixed on the inner end of the shaft 212. Secured to the outer end of the shaft 212 is a depending hand lever 229 (Fig. 11) having a spring-pressed detent 230 (Fig. 1) for holding it in either extreme position of adjustment. It will be evident that with the clutch 203 adjusted to connect the gear 215 to the shaft 172, the latter may be rotated manually by the hand wheel 218 either at a high speed or at a low speed depending on the adjustment of the clutch 220.

The power drive, which in the present instance is periodic to impart a step-by-step movement to the cross slide 160 once for each reciprocation of the work table 22, is connected through the clutch element 206 which is rigid with a bevel gear 231 meshing with a bevel gear 232 fixed on the lower end of a vertical stub shaft 233 journaled in the upper wall of the slide 36. Secured to the upper end of the shaft 233 is a pinion 234 which meshes with an internal gear 235 closed at the top. The gear 235 is rotatable against a peripheral flange 236 on a fixed upstanding stud 237 anchored centrally in a flat circular bearing projection 238 on the top wall of the slide 36.

Figures 4, 14, 15:
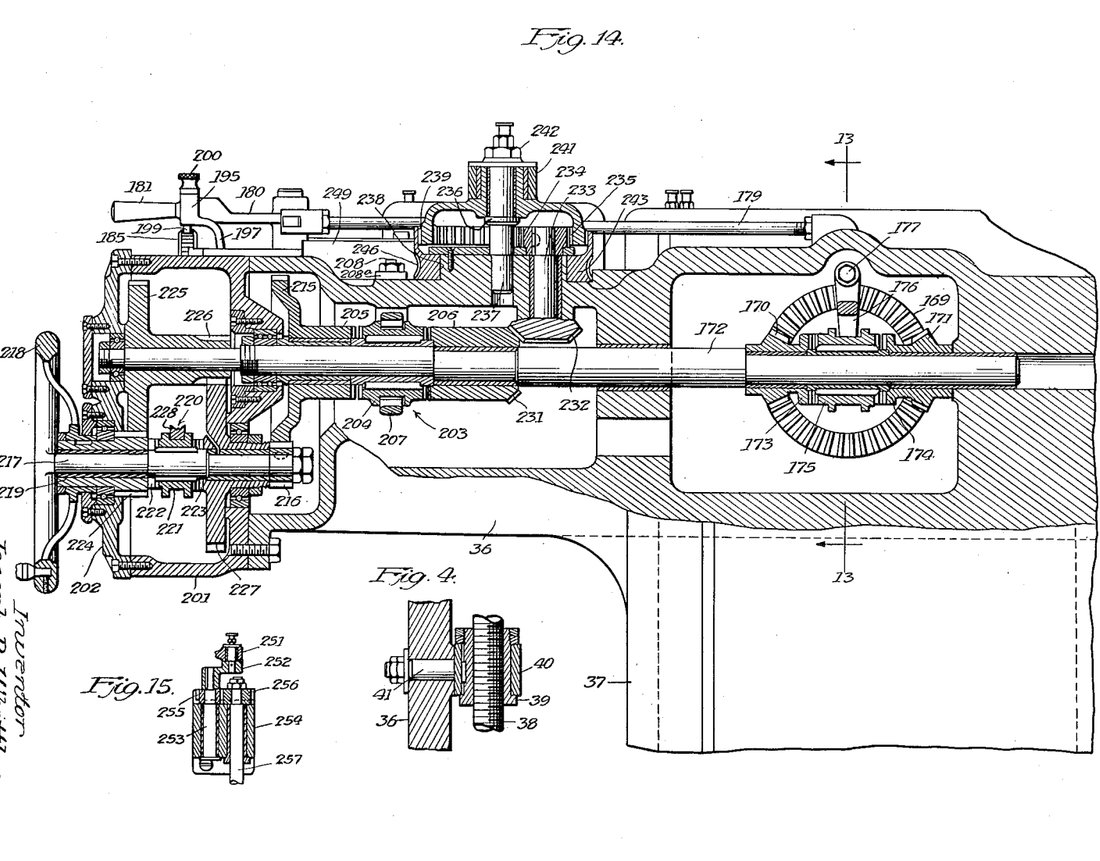
Fig. 4 is a detail sectional view of the vertical feed nut.
Fig. 14 is a vertical sectional view taken along line 14—14 of Fig. 10.
Fig. 15 is a sectional detail view taken along line 15—15 of Fig. 10.
Figures 8, 9, 10:
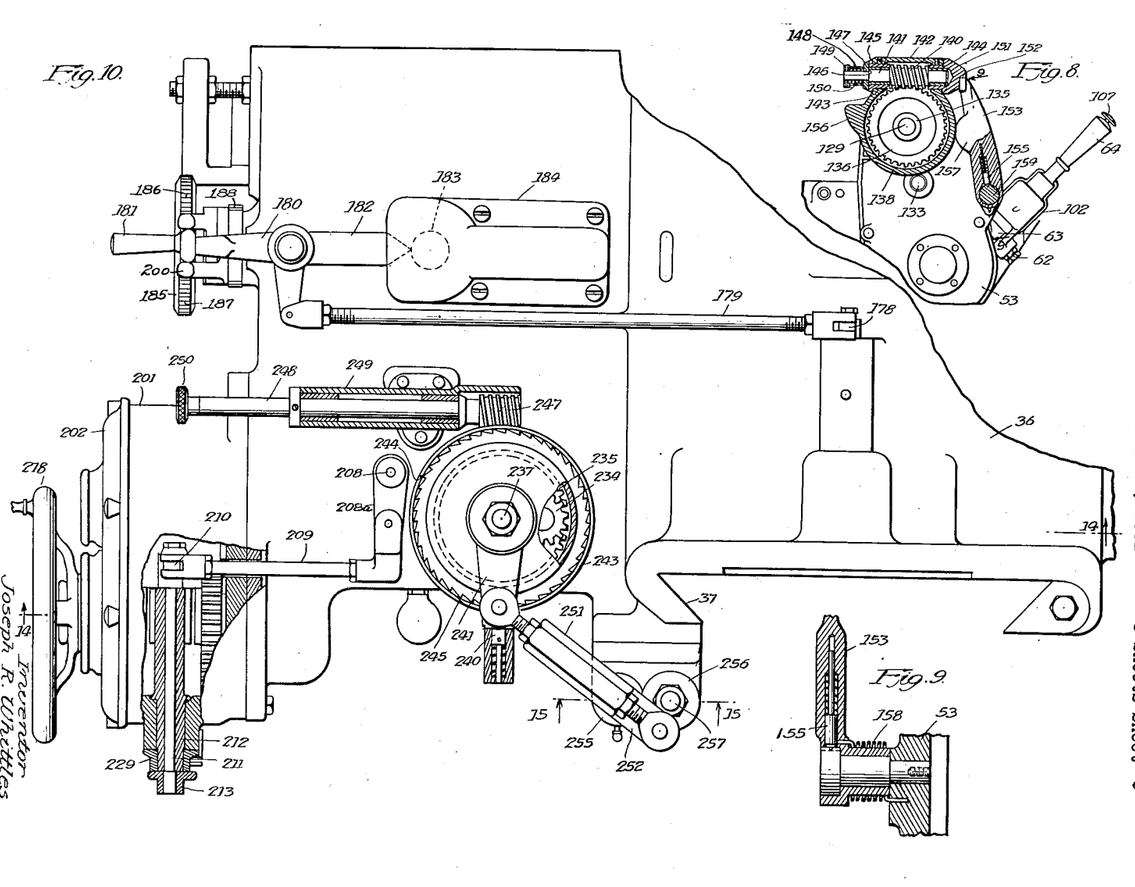
Fig. 8 is a sectional detail view taken substantially along line 8—8 of Fig. 5.
Fig. 9 is a sectional detail view taken substantially along line 9—9 of Fig. 8.
Fig. 10 is a fragmentary plan view of the headstock.
Figure 11:
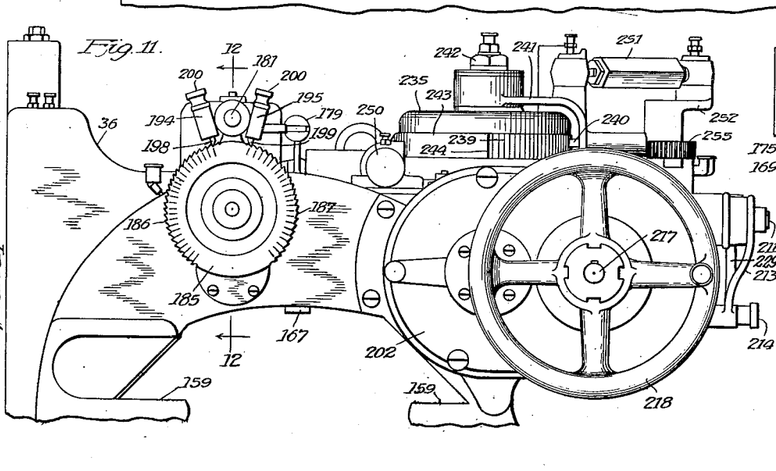
Fig. 11 is a front end view of the headstock.

Formed on the exterior of the gear 235 is a ratchet 239 (Figs. 10, 11 and 14). A spring-pressed pawl tooth 240 is slidably mounted in the outer end of a pawl arm 241 for engagement with the ratchet 239. The arm 241 is pivotally mounted on the upper end of the stud 237 against the top of the gear 235, the parts being confined in assembled relation by a nut 242. The arm 241 is periodically oscillated through a stroke of fixed amplitude, and in one direction of movement is adapted through the pawl tooth 240 to actuate the ratchet 239.

To provide means for adjusting the rate of feed over a wide finely graduated range, an annular shield 243 is mounted for rotary adjustment on the circular projection 238 and extends about the ratchet 239. The shield 243 is formed in its periphery with an opening 244 exposing a portion of the ratchet 239 greater in peripheral extent than the ampltitude of the pawl tooth 240. One edge of the opening 244 is beveled as indicated at 245 for engagement by the tooth 240 to effect withdrawal of the latter from the ratchet 239 at a predetermined point in its stroke. It will be evident that the shield 243 thus may be adjusted to vary the extent of movement of the ratchet over the entire range from zero to the full stroke of the pawl tooth 240. Graduations are provided on the shield 243 to indicate the degree of cross movement in each step.

The means for effecting adjustment of the cross movement preferably comprises a worm gear 246 (Fig. 14) formed integral with the base of the shield 243. The gear 246 meshes with a worm 247 on the rear end of a shaft 248 which is journaled in an elongated bearing bracket 249 on the slide 36, and extends to the front of the slide where it is provided with a suitable hand knob 250.

The pawl arm 241 is connected through a longitudinally adjustable link 251 to a crank arm 252 fixed on the upper end of a stub shaft 253 (see Fig. 15) journaled in a bearing lug 254 on the side of the slide 36. A gear 255 rigid with the shaft 253 meshes with a gear 256 on the upper end of a vertical shaft 257 rotatably anchored in the lug 254. The shaft 257 extends to the base of the machine for a vertical spline connection with a suitable power drive.

In the present instance, (see Fig. 18) the lower end of the shaft 257 extends slidably through a gear housing 258 on the front wall of the column 32. Splined for relative axial movement on the shaft 257 and confined between the vertical end walls of the housing 258 is a gear 259 which meshes with a gear 260 fixed on a stub shaft 261 seated in a bearing 262 in the base wall of the column 32. The base of the column 32 is formed longitudinally of the bed 20 with a cylindrical casing 263 opening intermediate its ends to the housing 258. Two cylinders 264 and 265 closed at their outer ends and open at their inner ends are secured respectively in the opposite ends of the casing 263. Mounted in the casing 263 with its ends reciprocably disposed respectively in the inner ends of the cylinders 264 and 265 is a piston 266 formed intermediate its ends with a longitudinal gear rack 267 in mesh with the gear 260. Reciprocation of the piston 264 thus is effective to oscillate the shaft 257.

Figure 16:
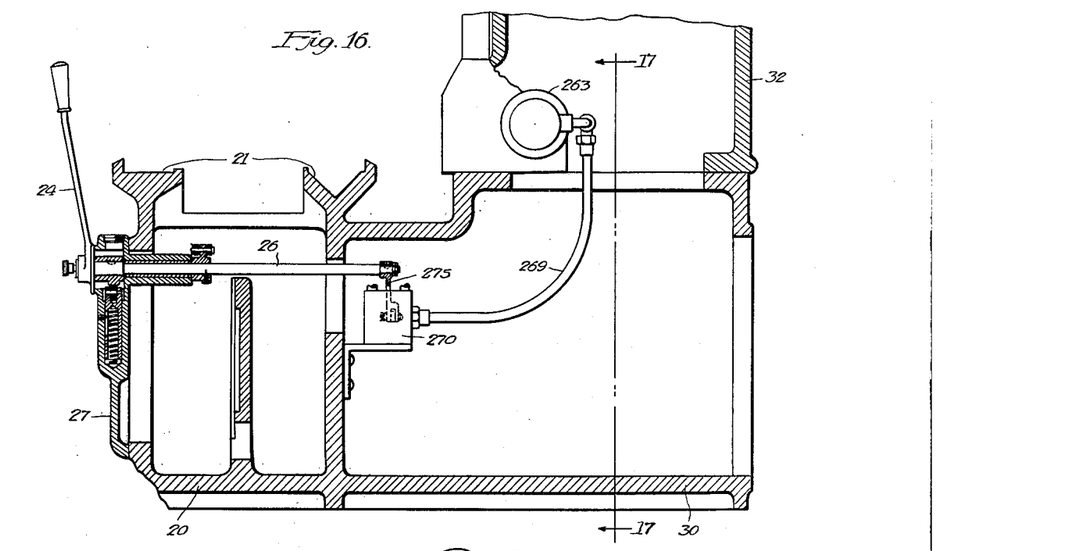
Fig. 16 is a vertical sectional view taken along line 16—16 of Fig. 1.
Figure 17:
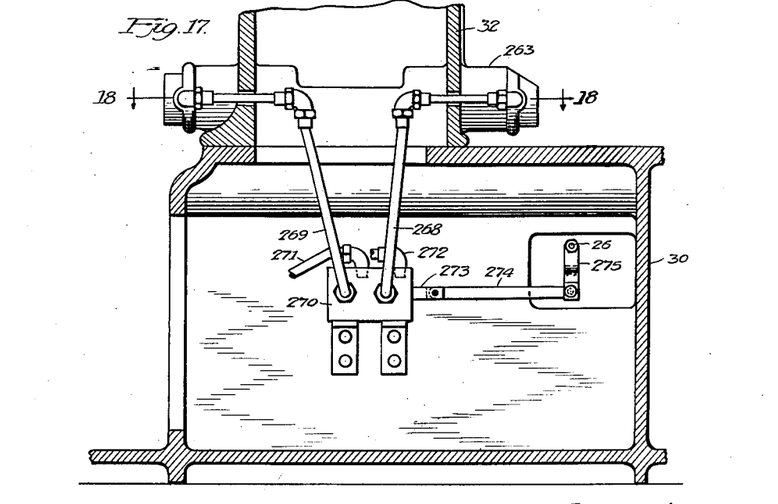
Fig. 17 is a vertical sectional view taken along line 17—17 of Fig. 16.

Connected to the outer ends of the cylinders 264 and 265 are two conduits 268 and 269 (see Fig. 16) for directing pressure fluid, such as oil, alternately against the opposite ends of the piston 266. The conduits 268 and 269 lead to a reversing valve 270 (see Figs. 16 and 17) which may be of any desired type, and which in the present instance is of the reciprocatory type having an inlet conduit 271, a discharge conduit 272 and an actuating stem 273. The latter is connected through a link 274 and an arm 275 to the rock shaft 26 for the reversing lever 24. Thus, the vertical shaft 257 will be oscillated reversely upon each reversal of the lever 24, and hence simultaneously with each reversal of the table 22. It will be understood that for narrow pieces of work no cross movement of the slide 160 is necessary, but that for wide pieces of work, the grinding wheel 162 may be traversed intermittently in steps of desired length into contact with new portions of the work after each cut.

The operation will be evident from the foregoing, and briefly is as follows: The lever 23 is actuated to institute the operation of the work table 22, and the button 164 is pressed to start the grinding spindle motor 163.

Downward feed of the grinding wheel 162 may be accomplished when desired manually by turning the hand wheel 130 or by power upon engaging the clutch 56—57 and pressing the button 93 to start the motor 72. The power down feed will be interrupted automatically at a predetermined point by opening of the switch 108, and can be stopped at will by pressing the button 94. Further manual down feed, which is desirable for the finish operation, is permitted and can be measured by the dial 147. The grinding wheel 16? may be raised from the work manually, or by power upon suitably actuating the lever 64 and depressing the button 107.

The cross indexing movement of the grinding wheel is available at will and to the extent and rate desired, and may be accomplished manually at a relatively high speed or low finishing speed, and by power. The automatic indexing occurs in timed relation to each complete reciprocation of the table 22, and is advantageous when the full width of the work cannot be ground in one stroke.

All of the controls are located at the front of the machine where they are in clear view of the operator and conveniently accessible. The double column construction permits the machine to operate at a high speed with accuracy and precision, thus improving the quality of the finished work and increasing the rate of production.

I claim as my invention:

1. In a grinding machine, in combination, an elongated horizontal bed, a work table longitudinally reciprocable on said bed, two spaced upright columns on said bed intermediate its ends and at one side of said table, the adjacent sides of said columns being formed with vertical guideways, a tie member rigidly connecting the upper ends of said columns, a headstock slide mounted for vertical movement on said guideways between said columns, said slide extending laterally over said table, a cross slide mounted on the underside of said headstock slide for horizontal movement transversely of said table, a grinding wheel rotatably mounted in said cross slide, and means for traversing said slides selectively.

2. In a grinding machine, in combination, a horizontal bed, a work table reciprocable on said bed, two spaced upright columns on said bed located along one side of said table, said columns being formed with vertical guideways, a headstock slide mounted on said guideways for vertical movement, said slide being disposed between said columns, a cross slide mounted on said headstock slide between said columns for horizontal movement transversely of the plane of said columns, a horizontal grinding spindle journalled in said cross slide and having a grinding wheel overhanging said table, means for traversing said headstock slide vertically, and means for traversing said cross slide.

3. In a grinding machine, in combination, an elongated horizontal bed, a work table longitudinally reciprocable on said bed, two spaced upright columns on said bed, the adjacent sides of said columns being formed with vertical guideways, a carriage mounted on said guideways for vertical movement, said carriage being disposed between said columns and extending over said table, a cross slide mounted on said carriage for horizontal movement transversely of said table, a vertical feed screw for supporting said carriage, means including a drive motor and controls therefor mounted in the front of said bed for driving said feed screw in either direction, and means for traversing said cross slide.

4. In a grinding machine, in combination, an elongated horizontal bed, a work table longitudinally reciprocable on said bed, two spaced upright columns on said bed, the adjacent sides of said columns being formed with vertical guideways, a carriage mounted on said guideways for vertical movement, said carriage being disposed between said columns, a cross slide mounted on said carriage for horizontal movement transversely of said table, a vertical feed screw for supporting said carriage, means in the front of said bed for driving said feed screw in either direction, and means for traversing said cross slide, said last mentioned means including speed and direction controls and manual drive means located on the front of said carriage.

5. In a grinding machine, in combination, an elongated horizontal bed having a rearward extension intermediate its ends, a work table longitudinally reciprocable on said bed, two spaced upright columns on said extension, the adjacent sides of said columns being formed with vertical guideways, a tie member rigidly connecting the upper ends of said columns, a carriage slidably mounted for vertical movement on said guideways, a vertical feed screw rotatably anchored at its upper end in said tie member and supporting said carriage, said carriage being formed on its under side with horizontal guideways extending transversely of said bed, a cross slide mounted on said horizontal guideways, and means for selectively traversing said carriages.

6. In a grinding machine, in combination, a support, a member slidable on said support, means including a reversing clutch for driving said member in either direction, indicator means driven from said last mentioned means in timed relation to the movement of said member, an actuator for said clutch, and reversing members carried by said indicator means for alternately engaging said actuator to automatically reverse said clutch upon movement of said first mentioned member into either extreme predetermined position.

7. In a grinding machine, in combination, a support, a slide mounted on said support, drive means including a reversing clutch for said slide, an actuator for said clutch, an indicator disk rotatably mounted on said support and operatively connected to said drive means for synchronous movement with said slide, said disk being formed on diametrically opposite sides with oppositely inclined ratchet teeth, and two reversing dogs mounted respectively in adjustable engagement with said teeth for movement with said disk, said dogs being disposed at opposite sides of said actuator for alternate engagement therewith.

8. In a grinding machine, in combination, a support, a member movable on said support, a drive element for traversing said member, a power drive, a manual drive, clutch means for connecting either of said drives selectively to said element, stop means for said power drive, said stop means including an adjustable abutment, a coacting abutment operatively connected to said drive element for movement in timed relation to said member and adapted to engage said first mentioned abutment to render said power means inoperable upon movement of said member into a predetermined position, indicator means operatively connected to said drive element for movement in timed relation to said member, means for adjusting the phase relation between said indicator means and said member, and a stop abutment movable into the path of said indicator means.

9. In a grinding machine, in combination, a support, a member movably mounted on said support, drive means including an electric motor and a starting switch for said motor for traversing said member in one direction, and a clutch including a hand actuator for operatively connecting said means to said member, said switch including an actuator mounted on said first mentioned actuator.

10. In a grinding machine, in combination, a support, a column on said support, a slide mounted on said column, drive means including an electric motor and a starting switch for said motor for traversing said slide in one direction, and a clutch including an actuator with a hand grip for operatively connecting said motor to said slide, said switch including an actuator mounted on said hand grip, said motor and said hand grip being mounted on said support.

11. In a grinding machine, in combination, a support, a slide on said support, a drive element for said slide, means for actuating said drive element, a worm gear continuously connected to said drive element for rotation in timed relation to the movement of said slide, a housing rotatable about said worm gear, a worm carried by said housing and meshing with said worm gear, means for adjusting said worm to adjust the phase relation between said housing and said slide, and a stop pawl pivotally mounted on said support for movement into position to engage said housing at a predetermined point in its rotation.

12. In a grinding machine, in combination, a support, a column on said support, a carriage vertically slidable on said column, a cross slide on said carriage, means for traversing said carriage, and means for traversing said slide, said last mentioned means including an intermittent motion device, an oscillatory shaft operatively connected to said device, said shaft being anchored in said carriage and extending downwardly to said support, and a reciprocatory hydraulic motor mounted on said support and having a spline connection with the lower end of said shaft.

13. In a grinding machine, in combination, a bed, two spaced upright columns on said bed, a carriage vertically slidable on said columns, a cross slide on said carriage, means including a feed screw and drive means therefor mounted on said bed for traversing said carriage, and means for traversing said slide, said last mentioned means including an intermittent motion device, an oscillatory shaft operatively connected to said device, said shaft being anchored at its upper end in said carriage and extending downwardly to said bed, and a hydraulic motor mounted at the base of said columns and having a spline connection with the lower end of said shaft.

14. In a grinding machine, in combination, an upright column, a support on said column, a member slidable on said support transversely of said column, a drive element for said member including a reversing clutch with an actuator, a variable speed manual drive including a speed selector with a hand actuator for said element, an intermittent power drive for said element, means including a hand actuator for connecting either drive selectively to said element, and means including a member connected to said element for movement in timed relation to said member for engaging said first mentioned actuator to automatically reverse said clutch, said actuators being located at the front of said support.

15. In a grinding machine, in combination, a horizontal bed, a work table reciprocable on said bed, two spaced upright columns on the rear of said bed located along one side of said table, said columns being formed with vertical guideways, a headstock slide mounted on said guideways for vertical movement, said slide being disposed between said columns, means for traversing said slide vertically, said means including a manual drive, a power drive and control means located on the front of said bed for rendering either of said drives available, a cross slide mounted on said headstock slide between said columns for horizontal movement transversely of the vertical plane of said columns, means for traversing said cross slide, and a horizontal grinding spindle journaled in said cross slide and having a grinding wheel overhanging said table.

16. In a grinding machine, in combination, an elongated horizontal bed, a work table longitudinally reciprocable on said bed, two spaced upright columns on said bed intermediate its ends and along one side of said table, said columns being formed with vertical guideways, a headstock slide located between said columns and mounted for vertical movement on said guideways, said slide projecting laterally over said table, a cross slide mounted on the underside of said headstock slide between said columns for horizontal movement transversely of said table, a horizontal grinding spindle journaled in said cross slide and having a grinding wheel overhanging said table for peripheral contact with the work thereon, an electric motor mounted on said cross slide and connected directly to said spindle, and means for traversing said slides selectively.

JOSEPH R. WHITTLES.